United States Patent
Daly et al.

(10) Patent No.: US 9,671,173 B2
(45) Date of Patent: Jun. 6, 2017

(54) RE-DIRECTION OF VAPOR FLOW ACROSS TUBULAR CONDENSERS

(71) Applicant: UOP LLC, Des Plaines, IL (US)

(72) Inventors: Phillip F. Daly, Palatine, IL (US); Steven P. Lankton, Wheeling, IL (US); Raymond E. Tucker, Derby, NY (US)

(73) Assignee: UOP LLC, Des Plaines, IL (US)

( * ) Notice: Subject to any disclaimer, the term of this patent is extended or adjusted under 35 U.S.C. 154(b) by 302 days.

(21) Appl. No.: 14/495,648

(22) Filed: Sep. 24, 2014

(65) Prior Publication Data

US 2015/0007964 A1  Jan. 8, 2015

Related U.S. Application Data

(62) Division of application No. 12/432,962, filed on Apr. 30, 2009, now Pat. No. 8,910,702.

(51) Int. Cl.
*F28B 1/02* (2006.01)
*F28B 9/02* (2006.01)
(Continued)

(52) U.S. Cl.
CPC ........... *F28D 15/02* (2013.01); *B01D 5/0009* (2013.01); *B01D 5/009* (2013.01); *B01D 5/0012* (2013.01); *B01D 5/0063* (2013.01); *B01D 5/0093* (2013.01); *F28D 7/06* (2013.01); *F28F 1/08* (2013.01); *F28F 1/10* (2013.01); *F28F 1/14* (2013.01); *F28F 1/24* (2013.01); *F28F 1/36* (2013.01); *F28F 1/42* (2013.01); *F28F 1/422* (2013.01); *F28F 1/426* (2013.01); *F28F 13/12* (2013.01); *F28F 13/187* (2013.01);
(Continued)

(58) Field of Classification Search
CPC .. B01D 5/0009; B01D 5/0036; B01D 5/0048; B01D 5/0063; B01D 5/009; B01D 5/0093; F28B 1/02; F28B 9/02
USPC .... 165/113, 114, 111, 74, 75, 181; 202/158, 202/161, 185.1, 185.4, 189
See application file for complete search history.

(56) References Cited

U.S. PATENT DOCUMENTS 2,073,258 A   3/1937  Wallis
2,167,028 A   7/1939  McGovern
(Continued)

FOREIGN PATENT DOCUMENTS

DE   19830163 A1   1/2000
GB   299084   10/1928
(Continued)

OTHER PUBLICATIONS

Honda et al., "Flow characteristics of condensate on a vertical col. Of horizontal . . .," Nippon Kikai Gakkai Ronbushu, B Hen, v53, n488, Apr. 1987, p. 1320-1328.
(Continued)

*Primary Examiner* — Leonard R Leo

(57) ABSTRACT

Vapor flow-diverting devices that re-direct upwardly flowing vapor, for example, in a downward direction across condenser tubes disposed in the upper or top section of a vapor-liquid contacting apparatus, are described. These devices are particularly beneficial in tubular condensers within distillation columns and may be used in combination with other associated equipment (e.g., a deflector plate and divider plate) as well as in combination with the tube surface enhancements to improve the heat transfer coefficient.

6 Claims, 11 Drawing Sheets

(51) Int. Cl.

| | | |
|---|---|---|
| *B01D 5/00* | (2006.01) | |
| *F28D 15/02* | (2006.01) | |
| *F28D 7/06* | (2006.01) | |
| *F28F 1/08* | (2006.01) | |
| *F28F 1/14* | (2006.01) | |
| *F28F 1/24* | (2006.01) | |
| *F28F 1/36* | (2006.01) | |
| *F28F 1/42* | (2006.01) | |
| *F28F 13/18* | (2006.01) | |
| *F28F 13/12* | (2006.01) | |
| *F28F 1/10* | (2006.01) | |
| *F28F 9/22* | (2006.01) | |

(52) U.S. Cl.
CPC . *F28B 1/02* (2013.01); *F28B 9/02* (2013.01); *F28F 9/22* (2013.01); *F28F 2009/226* (2013.01); *F28F 2210/06* (2013.01)

(56) References Cited

U.S. PATENT DOCUMENTS

| | | | |
|---|---|---|---|
| 2,341,281 A | 2/1944 | McGovern | |
| 2,342,838 A * | 2/1944 | Brunjes | B01D 5/0009 165/145 |
| 2,537,024 A | 1/1951 | Bay | |
| 2,591,010 A | 4/1952 | Rollins | |
| 2,662,850 A | 12/1953 | Kraft | |
| 2,780,589 A | 2/1957 | Brewer et al. | |
| 2,986,377 A | 5/1961 | Naab | |
| 2,994,647 A | 8/1961 | Williamson | |
| 3,358,750 A | 12/1967 | Thomas | |
| 3,384,154 A | 5/1968 | Milton | |
| 3,409,515 A | 11/1968 | Baird | |
| 3,505,173 A | 4/1970 | Randell | |
| 3,707,185 A | 12/1972 | Modine et al. | |
| 3,795,273 A | 3/1974 | Brigida et al. | |
| 3,830,628 A | 8/1974 | Kaartinen | |
| 3,875,997 A | 4/1975 | Newson et al. | |
| 3,892,548 A | 7/1975 | Gardey | |
| 3,938,588 A * | 2/1976 | Coit | C02F 1/20 165/114 |
| 4,227,572 A * | 10/1980 | Harlan | B21C 37/26 165/184 |
| 4,245,469 A | 1/1981 | Fortini | |
| 4,305,460 A | 12/1981 | Yampolsky | |
| 4,313,491 A | 2/1982 | Molitor | |
| 4,477,396 A | 10/1984 | Wilkinson | |
| 4,550,775 A | 11/1985 | Edwards et al. | |
| 4,648,441 A | 3/1987 | Van De Sluys | |
| 4,788,020 A | 11/1988 | Yampolsky | |
| 4,960,102 A | 10/1990 | Shellenberger | |
| 5,091,075 A | 2/1992 | O'Neill et al. | |
| 5,111,876 A | 5/1992 | Nash | |
| 5,203,970 A | 4/1993 | Ellis, Jr. | |
| 5,307,871 A | 5/1994 | Jalilevand et al. | |
| 5,347,980 A | 9/1994 | Shellenberger | |
| 5,507,356 A | 4/1996 | Roth et al. | |
| 5,614,066 A | 3/1997 | Williamson | |
| 5,667,005 A | 9/1997 | Kakutani et al. | |
| 5,715,689 A | 2/1998 | Byczynski et al. | |
| 5,792,238 A | 8/1998 | Johnson et al. | |
| 6,041,852 A * | 3/2000 | Sato | F28B 1/02 165/114 |
| 6,176,302 B1 | 1/2001 | Takahashi et al. | |
| 6,273,182 B1 | 8/2001 | Paultler et al. | |
| 6,488,078 B2 | 12/2002 | Beutler et al. | |
| 6,584,801 B2 | 7/2003 | Erickson | |
| 7,093,650 B2 | 8/2006 | Hashimoto | |
| 7,258,939 B2 | 8/2007 | Jeong | |
| 8,043,417 B2 * | 10/2011 | Daly | B01D 5/0012 165/165 |
| 8,196,909 B2 | 6/2012 | Daly | |
| 8,684,337 B2 | 4/2014 | Daly et al. | |
| 2001/0006106 A1 | 7/2001 | Beutler | |
| 2002/0074114 A1 | 6/2002 | Fijas | |
| 2002/0096314 A1 | 7/2002 | Liu | |
| 2003/0009883 A1 | 1/2003 | Thors | |
| 2003/0015316 A1 | 1/2003 | Burkey | |
| 2004/0182107 A1 | 9/2004 | Kang | |
| 2005/0163680 A1 | 7/2005 | Le | |
| 2006/0000586 A1 | 1/2006 | Katsumata | |
| 2007/0089868 A1 | 4/2007 | Houfuku | |
| 2007/0151716 A1 | 7/2007 | Lee et al. | |
| 2010/0276122 A1 | 11/2010 | Daly et al. | |
| 2012/0222447 A1 | 9/2012 | Daly | |

FOREIGN PATENT DOCUMENTS

| | | |
|---|---|---|
| GB | 658614 | 10/1951 |
| GB | 705661 | 3/1954 |
| GB | 872255 | 7/1961 |
| GB | 940404 | 10/1963 |
| GB | 1212430 | 11/1970 |
| JP | 2004340525 A | 12/2004 |
| WO | WO 9529003 A1 | 11/1995 |

OTHER PUBLICATIONS

Honda et al., "Flow characteristics of condensate . . .," ASME, Conf. Proc./1987 ASME-JSME Therm. Eng. Conf., Honolulu, HI, JSMe, Tokyo JP, New York, NY v1, 1987, p. 517-524.

Honda et al, "Theoretical model of film condensation in a bundle of horizontal low finned tubes," Journal of Heat Transfer, Transactions ASME, v 111, n 2, May 1989, p. 525-532.

Honda et al, "A Theoretical model of film . . .," American Society of Mechanical Engineers, Heat Transfer Division, ASME, v. 85, 1987, p. 79-85.

Jiang et al., "Enhanced flow and heat-mass of evaporative condenser," Journal of Engineering Thermophysics. V 29. n 10 Oct. 2008, p. 1698-1702. [Machine Translation].

Akahavan-Behabadi et al., "Pressure drop increase of forced . . .," International Communications in Heat and Mass Transfer, v 35, n 9, Nov. 2008, p. 1220-1226.

Bowman et al., "Investigation and development of condensation . . .," AES, v 42, 200-2; 2002 ASME, p. 545, 553.

Requirement for Election dated Aug. 3, 2011 for U.S. Appl. No. 12/433,064.

Applicant's Aug. 8, 2011 Response to Election/Restriction Filed for U.S. Appl. No. 12/433,064.

Office Action dated Oct. 12, 2011, for U.S. Appl. No. 12/433,064.

Applicants' Jan. 11, 2012 Response to the Oct. 12, 2011 Office Action for U.S. Appl. No. 12/433,064.

* cited by examiner

RE-DIRECTION OF VAPOR FLOW ACROSS TUBULAR CONDENSERS

FIELD OF THE INVENTION

The invention relates to heat exchangers such as tubular condensers with tubes that may extend horizontally or vertically within a distillation column. The heat exchangers have a vapor flow-directing device to re-direct vapor flow (e.g., in the downward direction) across a section of the condenser tubes to reduce the possibility of entrainment of condensed liquid.

DESCRIPTION OF RELATED ART

Heat exchangers are prevalent in refining, petrochemical, and other industrial applications in order to efficiently transfer heat available in one process fluid to another fluid, such that the overall utility requirements are reduced. The advantages of using heat exchangers, for example, to optimize the recovery of heat and thereby minimize the costs associated with outside sources of cooling/refrigeration media (e.g., cooling water) and/or heating media (e.g., fuel gas) are well recognized. The art has continually sought to improve the performance of heat exchangers by achieving the closest possible approach to the equilibrium level of heat transfer between two fluid streams at the lowest possible equipment, operating, and maintenance costs.

Heat exchange is commonly carried out, for example, between a relatively hot reactor effluent fluid and a relatively cold reactor feed fluid. A combined reactor feed/effluent heat exchanger in this case can beneficially add at least a portion of the heat required to raise the reactor feed to a specified reaction temperature and at the same time remove at least a portion of the heat required to cool the reactor effluent for further processing or storage. A specific application for heat exchangers involves their use within (rather than external to) other processing equipment such as vapor-liquid contacting apparatuses and even reactors. In the case of a reactor, for example, a heat exchanger within a vapor space above a reaction zone may beneficially condense evaporated reactants while allowing the removal of uncondensed vapors, particularly product vapors.

Vapor-liquid contacting apparatuses known to utilize internal heat exchangers, and particularly condensers, include distillation columns. The specific operating conditions of distillation columns employing internal heat exchangers may vary significantly in order to accomplish a wide range of component separations from vastly different types of mixtures that may be subjected to distillation. Examples of distillation columns include those used in a number of column separations such as stripping and rectification, as well as those used in various forms of distillation such as fractional distillation, steam distillation, reactive distillation, and distillation in divided wall columns. These separation processes may be operated using distillation columns in either batch or continuous modes, with common design objectives being the reduction in installed and operating costs. The equipment and utilities required for the supply and removal of heat to and from the column significantly impact these costs in many cases.

Various benefits may be achieved from installing heat exchangers inside distillation columns or other apparatuses, rather than external to the cylindrical column shell. These benefits may be appreciated with reference to the operation of conventional external heat exchangers, which require removing a stream from the column, passing it through the external exchanger to supply or remove heat, and returning at least part of the heated or cooled stream back to the column. For example, overhead vapor may be withdrawn from a top or overhead section of the column (e.g., after rising from a top contacting tray) and passed to an external heat exchanger, namely a condenser or partial condenser, that condenses liquid from the withdrawn vapor, a portion of which is then generally returned (e.g., using a pump) to the column as reflux. In addition to an external heat exchanger and pump, the overhead system frequently also comprises a receiver vessel to separate the condensed liquid from uncondensed vapor, as well as the associated pipes, valves, and instrumentation. In a manner analogous to that of a condenser, external reboiler heat exchangers may also provide vapor to (rather than remove vapor from) the column by heating a liquid stream removed from the bottom section of the column. Likewise, vapor and liquid streams may be withdrawn from a central section between the top and bottom sections of the column, heated or cooled using an external heat exchanger, and returned to the column. In each case, the equipment requirements are comparable.

By locating a heat exchanger within a vapor-liquid contacting apparatus such as a distillation column, some equipment (e.g., an overhead reflux pump) and the associated supporting structure can be eliminated, thereby saving both equipment cost and space. Additionally, the pressure drop through an internal heat exchanger can be lower than that for an equivalent external heat exchange system. This becomes an important factor when the column is operated at nearly atmospheric or even sub-atmospheric pressure, for example in cases where the column temperatures are limited due to heat sensitivity of the mixture being processed in the column.

Representative examples of low pressure distillation columns in which internal condensers have been successfully employed include those used in the product recovery sections in the commercial production of phenol via cumene oxidation, as well as in the upstream production of cumene via benzene alkylation. Also, U.S. Pat. No. 2,044,372, U.S. Pat. No. 4,218,289, U.S. Pat. No. 5,507,356, and DE 198 30 163 A1 describe the use of various heat exchangers inside columns to at least partially condense vapor in the top section of columns. U.S. Pat. No. 2,044,372 describes the use of a vertical submerged condenser between a low pressure section and a high pressure section of a single column.

A particular type of heat exchanger that may be used internally (or that is otherwise commonly employed commercially), is a tubular exchanger comprising a bundle of tubes, whereby heat is transferred between fluid external to the tubes and fluid passing through the tubes. So-called "stabbed-in" tube bundles have advantages over internal welded plate bundles in terms of their ease of removal for maintenance or replacement. In the case of stabbed-in tubular condensers, with the tubes being oriented horizontally or vertically in the top section of a distillation column, overhead vapor in the column is condensed on the outside or external surface of the tubes. In view of the desirability of their use, there is an ongoing need in the art for improvements in internal tubular heat exchangers and particularly those disposed within a vapor-liquid contacting apparatus such as a distillation column.

SUMMARY OF THE INVENTION

The present invention is associated with the discovery of improvements in heat exchangers comprising tube bundles and particularly internal tubular condensers disposed within vapor-liquid contacting apparatuses such as distillation columns. Aspects of the invention relate to the use of vapor flow-directing devices disposed within columns and surrounding or substantially surrounding (e.g., over a surrounding area except for an inlet for downwardly flowing vapor, a non-condensed vapor outlet, and a condensed liquid outlet) tubes within the column that are used in tube bundles of internal tubular condensers as discussed above. Vapor flow-directing devices can be used, for example, as a "shroud" or a means for protecting all or at least a section, such as a co-current, vapor-liquid contacting section, of the tubes within the column from being directly impacted by the rising vapor that is ultimately cooled on external surfaces of the tubes. Vapor flow-directing devices, by directing vapor, for example, in the downwardly flowing direction over at least the co-current contacting section of tubes therefore allow in this section, vapor and condensed liquid to flow co-currently. This reduces or even eliminates the risk of entrainment of condensed liquid by vapor that, in the absence of the vapor flow-directing device, would normally flow upwardly during contact with the external surfaces of the condenser tubes.

Co-current flow of downwardly flowing vapor and liquid that is condensed on external surfaces of the condenser tubes is generally achieved by having a downwardly flowing vapor inlet of the vapor-flow directing device above at least the co-current contacting section of the tubes. Separation of the vapor that is not condensed (non-condensed vapor), from the liquid that is condensed as a result of heat exchange across the external surfaces of the tubes, is carried out in a vapor-liquid disengagement volume. The disengagement volume, in addition to the tubes or a portion of the tubes within the column, is generally encompassed or substantially surrounded by the vapor flow-directing device. According to a representative embodiment, the vapor-liquid disengagement volume is below the condenser tubes or portion thereof within the column. In this case, a deflector plate may be positioned below the tubes and in the disengagement volume to improve the vapor-liquid separation after non-condensed vapor and condensed liquid flow co-currently past the co-current contacting section of the tubes. The deflector plate may extend horizontally or may be somewhat inclined from the horizontal to ensure that condensed liquid impacting this plate drains freely through a condensed liquid outlet leading back into the column (e.g., back to the top contacting tray, plate, or stage). According to other embodiments, a divider plate may extend into the vapor flow-directing device to separate a co-current contacting section of the tubes, within a contacting volume, from a disengagement section of the tubes, within the vapor-liquid disengagement volume.

Accordingly, further embodiments of the invention are directed to apparatuses for vapor-liquid contacting. The apparatuses comprise a vertically oriented column having disposed therein a plurality of condenser tubes (e.g., extending vertically or horizontally). The apparatuses also comprise a vapor flow-directing device disposed within the column and having a vapor inlet above at least a co-current contacting section of the tubes and defining a vapor-liquid disengagement volume. The apparatuses further comprise a non-condensed vapor outlet external to the column and in communication with the vapor-liquid disengagement volume and a condensed liquid outlet internal to the column and in communication with the vapor-liquid disengagement volume.

According to a particular embodiment, the vapor-liquid disengagement volume is below the tubes, and, in this embodiment, a deflector plate may be positioned below the tubes and within the vapor-liquid disengagement volume. The deflector plate may, for example, be above the non-condensed vapor outlet and extend horizontally or at an incline. In other representative embodiments, the apparatus as described above may further comprise a divider plate extending into the vapor flow-directing device and dividing the co-current contacting section of the tubes, in a contacting volume, from a disengagement section of the tubes, in the vapor-liquid disengagement volume.

Representative apparatuses include distillation columns as well as reactors, including those used in reactive distillation. Other types of reactors are those which may benefit from internally condensing at least a portion of vapors within the reactor. For example, it may be desired to condense a condensable portion of the reactor effluent within the reactor to provide an internal reflux and/or avoid all or at least part of the downstream cooling requirements.

Further aspects of the invention relate to the use of condenser tubes in the apparatuses described above, in which the tubes have one or more surface enhancements that improve their performance within a section (e.g., an overhead section) of the length of a vertically oriented column. The surface enhancement(s) of the tubes beneficially improve(s) their heat transfer coefficient and consequently the overall heat exchange capacity of an internal tubular condenser bundle of a given size that employs these tubes. This higher capacity in some instances (e.g., in the case of large columns and/or columns operating in low pressure drop/low mass velocity regimes) can overcome the requirement to use more costly heat exchangers such as welded plate or external heat exchangers. In particular, the tube surface enhancements described herein can increase the heat transfer coefficient of tubes used in a tubular condenser such that the required exchanger area is reduced to below that which corresponds to a practical size limit (e.g., about 1.5 meters (5 feet) diameter of the tube bundle) or weight limit for installation at the top of a distillation column.

Further embodiments of the invention are therefore directed to apparatuses for vapor-liquid contacting having tubes with surface enhancements to improve heat transfer. The apparatuses comprise a vertical or substantially vertical column (e.g., a cylindrical column having an axis that is aligned vertically or within about 5 degrees of vertical). The column contains or has disposed therein a plurality of condenser tubes or a tube bundle (e.g., in the form of a U-tube bundle with U-shaped individual tubes) of the internal tubular condenser and a vapor flow-diverting device as described above. According to particular embodiments, the tubes extend substantially horizontally or otherwise substantially vertically over a section of the column length, for example an overhead section near the top of the column. All or at least a portion of the condenser tubes have external surfaces comprising one or more surface enhancements to improve the heat transfer coefficient of the tubes.

Representative surface enhancements include shaped recessions, circumferentially extending fins, axially extending fins, or a combination of these. In the case of circumferentially extending fins, the fins may be characteristic of those used for "low finned" tubes, with the fins having a height from about 0.76 mm (0.03 inches) to about 3.8 mm (0.15 inches). Circumferentially extending fins generally refer to a plurality of "plates" that are spaced apart (e.g., uniformly or at regular intervals) along the axial direction of the tube. The plates of circumferentially extending fins, in an alternative embodiment, may be provided by a single, continuously wound, helical spiral rather than discreet extensions. In either case, the plates often each have an outer edge (or outer perimeter), with a single tube extending through central sections of a plurality of plates. The outer edges of the plates may be circular or may have some other geometry, such as rectangular or elliptical. In the case of circumferentially extending fins, further tube surface enhancements can include one or more notches on the outer edges of all or a portion of these fins or plates, where the notches may be spaced apart radially about the edges, for example, in a uniform manner or at a constant radial spacing. In other embodiments, non-uniform radial spacing may be used. In the case of tubes used in a vertically aligned tube bundle of a condenser, it may be desirable to align the notches axially with respect to adjacent fins (i.e., the immediately higher and/or lower circumferentially extending fins). The axial alignment of these notches, such that they may be superimposed when viewed axially, can improve condensate drainage, especially when the tubes are oriented vertically.

In the case of shaped recessions on the tube surface, all or at least a portion of the recessions may extend axially (e.g., in the form of one or more elongated troughs) or otherwise be aligned in one or more axially extending rows (e.g., in the form of a plurality of discreet, smaller recessions). One or more axially extending fins may also be used to improve the heat transfer coefficient of the tubes, alone or in combination with the shaped recessions and/or circumferentially extending fins. Combinations of surface enhancements (e.g., axially extending recessions and/or axially aligned rows of recessions, together with circumferentially extending fins), are generally all located in the same region of the tubes used for heat transfer, for example the region extending vertically or horizontally over a section of the length of a distillation column.

Alone or in combination with surface enhancements, the tubes themselves, while extending in a generally linear direction, may have, in at least one region of the tubes used for heat transfer as described above, a non-linear central axis, which can provide a non-linear internal flow path for fluid flow through the tubes. For example, the tubes, as well as their internal central axes, may have a wave, jagged, or helical (coiled) shape to increase pressure drop and/or fluid mixing. Otherwise, an overall helical fluid flow path can be provided, for example, in the case of a flattened or eccentric profile tube (e.g., having a rectangular cross-section or otherwise an oval-shaped or elliptical cross section) that has a twisted tube geometry (i.e., such that a major axis of the cross-sectional shape, for example the major axis of an ellipse, rotates clockwise or counterclockwise along the linear direction of the tube). In the case of a twisted tube geometry, the central axis of fluid flow may be linear or non-linear (e.g., helical). Adjacent tubes extending generally linearly, for example in a distillation column section where heat transfer takes place, but having a wave, jagged, or helical shape or a twisted tube geometry may have a plurality of external contact points with adjacent tubes, with these contact points possibly being evenly spaced apart by regions where the adjacent tubes are not in contact. Such spaced apart contact points with one or more adjacent tubes can physically stabilize the positions of the tubes and even avoid the need for baffles or tube supports.

Alternatively, an enhanced condensing layer (ECL) may be applied to the outside or external surfaces of the tubular condenser tubes as another type of surface enhancement. Examples of ECLs include textured surfaces, chemical coatings that improve drop-wise condensation, nano-coatings, etc.

In addition to their exterior surfaces, the tube internal surfaces may be modified to improve heat transfer capability. For example, all, a majority, or at least a portion of the tubes in the tube bundle may have internal surfaces, at least in a region of the tubes that extends (e.g., vertically or horizontally) over a section of the column length, onto which a coating is bonded. If a coating is used, it is generally bonded to at least a region of the tubes (e.g., where condensation occurs on the external tube surfaces) having the surface enhancement(s), as discussed above, on outer or external surfaces. A representative internal tube surface coating comprises a porous metallic matrix that can improve the internal heat transfer coefficient of the tube and consequently the overall heat exchange capacity of a condenser using the tubes. Some suitable coatings are referred to as enhanced boiling layers (EBLs), which are known in the art for their applicability to heat transfer surfaces on which boiling occurs, and particularly for their ability to achieve a high degree of heat transfer at relatively low temperature differences. An EBL often has a structure comprising a multitude of pores that provide boiling nucleation sites to facilitate boiling.

An EBL or other coating may be applied to the inside or internal surfaces of tubular condenser tubes. A representative metal coating is applied as described, for example, in U.S. Pat. No. 3,384,154. The coated metal is subjected to a reducing atmosphere and heated to a temperature for sufficient time so that the metal particles braze or sinter together and to the base metal surface. An EBL may also have mechanically or chemically formed reentrant grooves as described, for example, in U.S. Pat. No. 3,457,990. Other known methods of applying coatings and EBLs in particular to metal surfaces, such as the internal surfaces of metal tubes, that may be used include those described in GB 2 034 355, U.S. Pat. No. 4,258,783, GB 2 062 207, EP 303 493, U.S. Pat. No. 4,767,497, U.S. Pat. No. 4,846,267, and EP 112 782.

In addition to EBLs, another internal enhancement for condenser tubes involves the use of one or a plurality of ridges, which may, for example, be in the form of a spiral or multiple spirals. Such ridges may be used to further improve the transfer of heat, and particularly sensible heat, across the internal tube surface. Internal ridges may be used alone or in combination with other features of condenser tubes as described herein. Further internal enhancements include twisted tape, wire matrix inserts (e.g., from Cal-Gavin Limited, Warwickshire, UK), and other in-tube heat transfer devices that can enhance the tubeside heat transfer coefficient.

Other embodiments of the invention are directed to tube bundles for a condenser comprising tubes and used in conjunction with a vapor flow-diverting device as described above. According to particular embodiments, a least a portion of the tubes, in an axially (e.g., vertically or horizontally, depending on the orientation of the tube bundle) extending section, comprise shaped recessions on their external surfaces as surface enhancements. At least a portion of the shaped recessions extend axially or are aligned in one or more axially extending rows (e.g., extending in the same or generally the same direction as the tubes, or the central axes of these tubes). The use of axially extending shaped recessions (e.g., in the form of troughs) may result in the formation of axially extending ridges, as in the case of a fluted tube. According to particular embodiments, the tubes further comprise one or more axially extending fins in the axially extending section (i.e., the same section as the shaped recessions). According to other embodiments, at least a portion of the tubes have a non-linear central axis and/or a twisted geometry, as discussed above, in the axially extending section, and optionally a plurality of spaced apart points of external contact with adjacent tubes. According to further embodiments, the tubes, at least in the axially extending section, have internal surfaces having a coating (e.g., a porous metallic matrix as discussed above) bonded thereon in the axially extending section.

Further aspects of the invention relate to the use of any of the condenser tubes as described above in tube bundles, in conjunction with the vapor flow-diverting device as described above, for heat exchange applications. Accordingly, embodiments of the invention are directed to methods of indirectly exchanging heat between two fluids, a first fluid and a second fluid, comprising contacting the first fluid, after diverting its flow from a first direction (e.g., upward) to a different, second direction (e.g., downward), with external surfaces of any of the condenser tubes as described above and passing the second fluid through the tubes. In particular applications in which the tube bundles are used as condensers, the first fluid is hotter than the second fluid, and a fraction of this first fluid is condensed on external surfaces of the tube bundle.

A particular heat exchange application of commercial interest involves the use of the condenser tubes in internal condensers for vapor-liquid contacting apparatuses such as distillation columns. Distillation refers to a separation process based on differences in the relative volatility of components present in an impure mixture. Distillation involves the purification of components having differing relative volatilities by achieving multiple theoretical stages of vapor-liquid equilibrium along the length of a vertical column. Rising vapor, enriched in a lower boiling component relative to the liquid from which it is vaporized in a lower stage in the column, is contacted with falling liquid, enriched in a higher boiling component relative to the vapor from which it is condensed in a higher stage in the column.

Accordingly, particular embodiments of the invention are directed to the use vapor flow-diverting devices as described above in combination with tube bundles comprising tubes as described above. The vapor flow-diverting devices and tube bundles are used in heat exchangers within vapor-liquid contacting apparatuses such as distillation columns. A first fluid comprising distillation column vapor, often rising in a top or overhead section of the column, is enriched in a lower boiling component, the purification of which is the objective of the distillation. The flow of this first fluid is diverted from the upward direction, using the vapor flow-diverting device, prior to contacting this fluid with the external surfaces of the tubes or tube bundle (e.g., to condense a liquid from this first fluid that is enriched in the lower boiling component, relative to the impure mixture being fed into the column and purified), while a second, cooling fluid (e.g., cooling water) is passed through the tubes. As a result of contacting the first fluid with the external surfaces of the tubes, a condensed liquid and a non-condensed vapor are formed. The non-condensed vapor may be removed from the column, while the condensed liquid is returned to an immediately lower contacting stage, for example as overhead reflux.

Other embodiments of the invention are directed to methods of purifying a lower boiling component from an impure mixture by distillation. The methods comprise condensing a liquid, enriched in the lower boiling component, from a downwardly flowing vapor on the external surfaces of the condenser tubes in the co-current contacting section of the apparatus as defined above. Particular embodiments further comprise removing the vapor from the column through the non-condensed vapor outlet and returning the liquid to the column through the condensed liquid outlet. Any of the apparatuses and methods described above and beneficially utilizing a vapor flow-directing device to provide a co-current contacting section of the tubes within the column, may be using in conjunction with any of the surface enhancements, coatings (e.g., EBLs), and/or tube geometries as discussed previously.

These and other aspects and embodiments associated with the present invention are apparent from the following Detailed Description.

The same reference numbers are used to illustrate the same or similar features throughout the drawings. The drawings are to be understood to present an illustration of the invention and/or principles involved. As is readily apparent to one of skill in the art having knowledge of the present disclosure, vapor-liquid contacting apparatuses, and particularly those comprising vertically oriented columns having tubular condensers disposed therein, according to various other embodiments of the invention, will have configurations (e.g., a number of tube passes) and components determined, in part, by their specific use.

DETAILED DESCRIPTION

Figure 1:
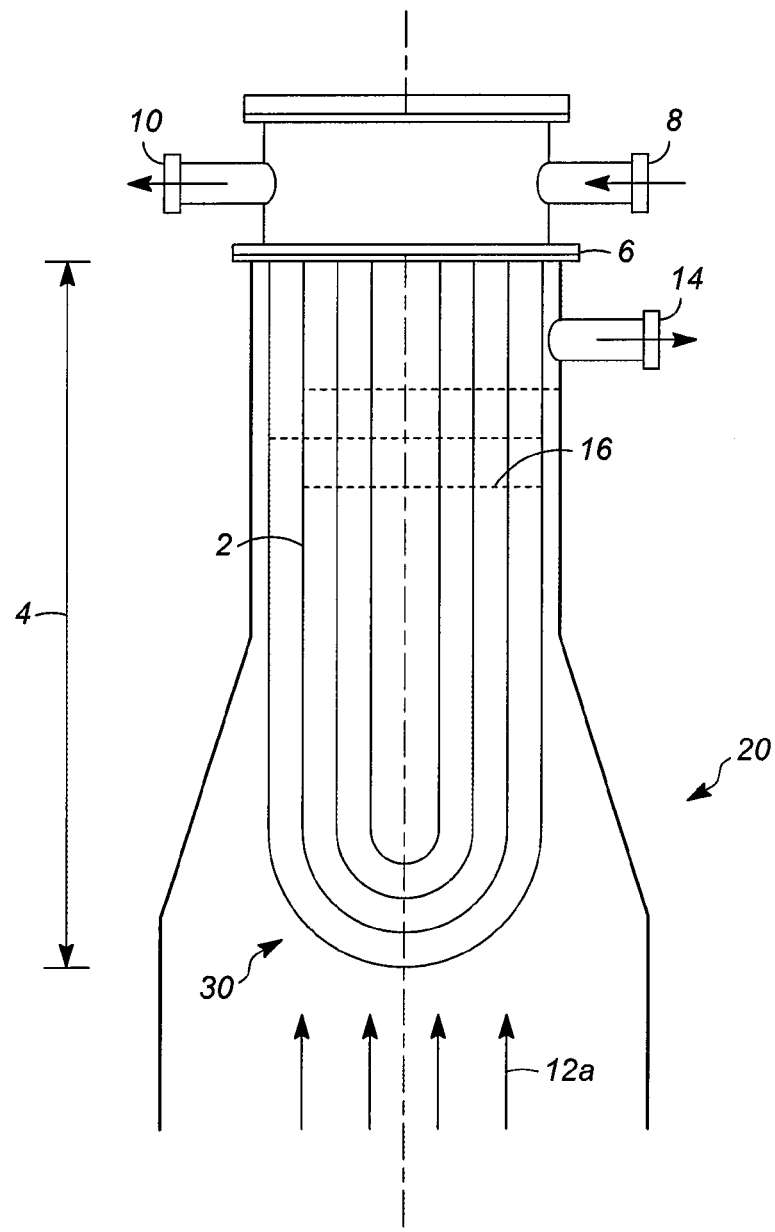
FIG. 1 depicts the upper section of a distillation column having an internal tubular condenser, with the tubes extending vertically over a section of the column length.
Figure 2:
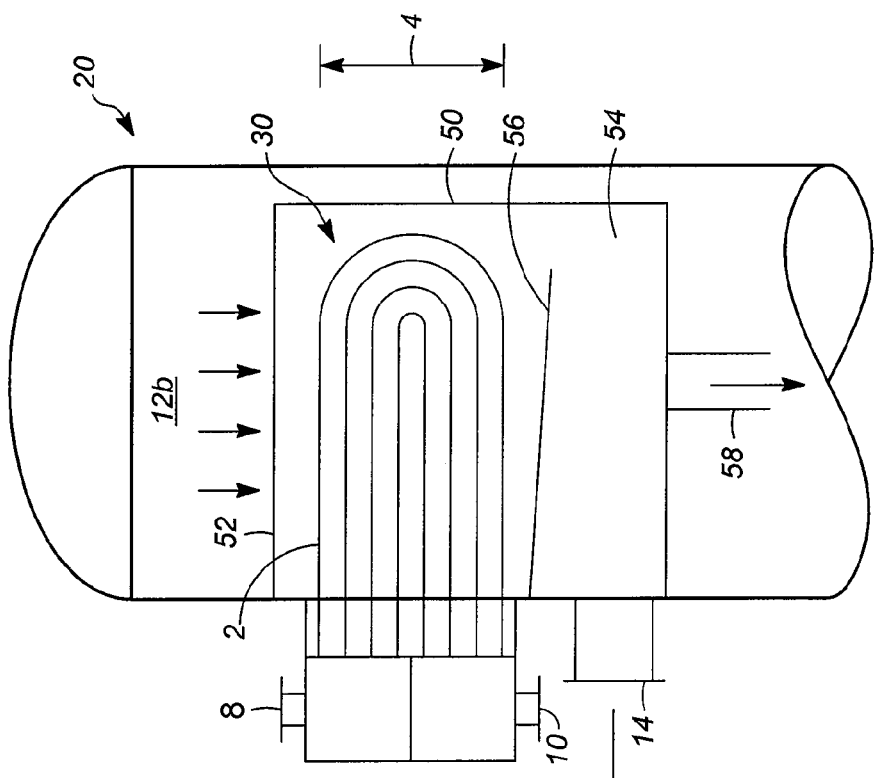
FIG. 2 depicts the upper section of a distillation column having an internal tubular condenser, with the tubes extending horizontally over a co-current contacting section within a vapor flow-directing device.

The invention is associated with improvements in heat exchangers and particularly internal tubular condensers used in vapor-liquid contacting apparatuses such as distillation columns. Internal tubular condensers, often referred to in the art as "column installed" or "stabbed-in" tubular condensers when used to condense vapors generated in distillation, are normally installed in the upper vapor-liquid contacting section of a column. These condensers may be installed either vertically from the top, as shown in FIG. 1 or horizontally from the side, as shown in FIG. 2. References to tubes extending vertically or horizontally are based on their general direction of orientation with respect to a vertically or substantially vertically oriented column in which they are disposed. Therefore, vertically extending tubes will extend, over the majority of their length, in the same general direction as the axis of the column, while horizontally extending tubes will extend, over the majority of their length, in the direction generally perpendicular to the axis of the column. Vertically or horizontally extending condensers refer in particular to heat exchangers having a tube bundle in which the tubes extend, respectively, vertically (or substantially vertically) or horizontally (or substantially horizontally) over a section (e.g., a top or overhead section) of the column length.

The use of tubular condensers within vapor-liquid contacting apparatuses is often economically attractive compared to external heat exchangers or internal, welded plate exchangers. However, in conventional internal tubular condensers, vapor flows generally upwardly through the tube bundle, whether the bundle is arranged vertically or horizontally. In either case, but especially for horizontally aligned internal tubular condensers, it is possible for vapor velocities in the upward direction to hold up or even re-entrain falling liquid condensate, thereby flooding the tube bundle and limiting its capacity. As discussed above, aspects of the invention are associated with the discovery of commercial benefits that can result from diverting the vapor flow from its generally upward flow direction in an overhead section of a column, prior to contacting this vapor with tubes of a tube bundle of an internal condenser. In particular, diverting the flow of vapor (containing condensable material), can enhance the overall performance of the condenser by reducing the detrimental entrainment of condensed liquid by otherwise upwardly flowing vapor and thereby improving the condensed liquid/non-condensed vapor separation. The performance of tubular condensers may therefore be increased using devices that beneficially direct vapor flow in particular directions across, and/or in particular sections of, a tube bundle positioned within a vapor-liquid contacting apparatus.

FIG. 1 shows an upper section of a distillation column 20 having a conventional internal tubular condenser 30, with a plurality of tubes 2 extending vertically over a section 4 of the column length. It is recognized that the entire length of the tube will generally not extend only in one direction, but will normally curve, for example in a U-bend, as shown in FIG. 1, to redirect fluid passing through the tubes back to a common tube sheet 6 securing the two ends of each of the tubes so that they are in communication with respective tube-side inlet 8 and outlet 10 conduits. During operation, upwardly flowing vapor 12a in the upper section of the distillation column 20 contacts tubes 2, through which cooling fluid (e.g., cooling water) is passed from the tube-side inlet 8 to the tube-side outlet 10. Contact between the relatively hot vapor 12a, comprising condensable material, and the relatively cool external surfaces of tubes 2 causes condensation, with condensed liquid falling back into the column interior and non-condensed vapor exiting through a non-condensed vapor outlet 14 that may be in communication with the column exterior. Both (i) the upwardly flowing vapor 12a and (ii) the fraction of this upwardly flowing vapor 12a that is the non-condensed vapor exiting the column are enriched, as a result of the distillation, in a lower boiling component initially present in an impure mixture. Compared to the upwardly flowing vapor 12a within the column, the non-condensed vapor exiting the column will normally be more enriched in this component, as a result of removing additional, higher boiling impurities through condensation. To improve contacting with tubes 2, the flow of upwardly-flowing vapor 12a may be passed from one side of the column 20 to the other side, using baffles 16, as it travels generally upwardly through tube bundle.

Figure 3:
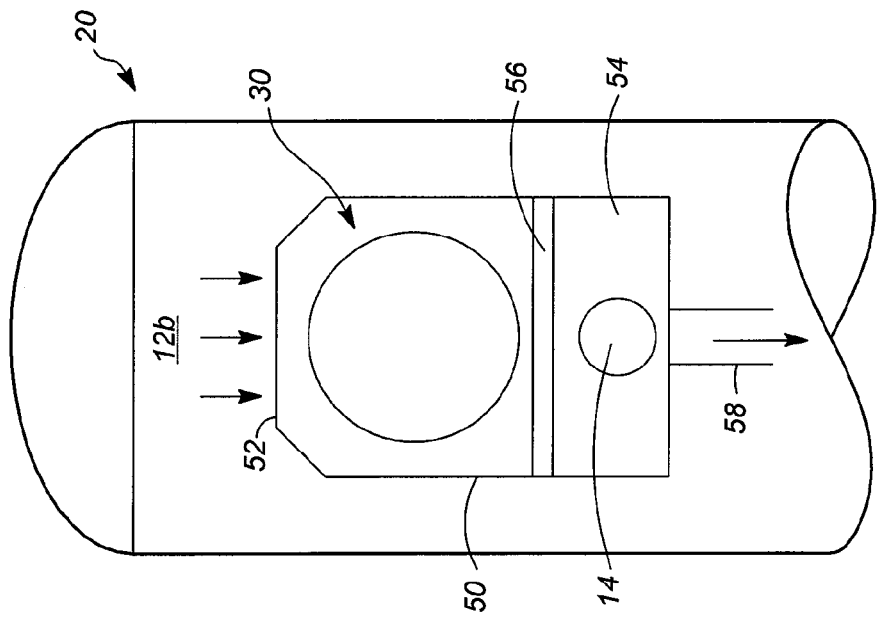
FIG. 3 depicts an end view of the upper section of the distillation column shown in FIG. 2.

Aspects of the invention are therefore directed to vapor flow-diverting devices that can act as a shroud around the tube bundle and re-direct vapor rising in the upper section of a vapor-liquid contacting device, such as from the top contacting stage of a distillation column, downwardly (rather than upwardly as shown in FIG. 1) through a co-current contacting section of the tubes in a tube bundle. For example, FIGS. 2 and 3 depict front and side views, respectively, of an upper section of a distillation column 20 containing a plurality of condenser tubes 2 in a horizontally aligned tube bundle (i.e., extending horizontally over a section 4 of the column length) of internal tubular condenser 30. Also disposed within the column is a vapor flow-directing device 50 that has a vapor inlet 52 above the tubes, such that the flow of vapor 12b is diverted downwardly through condenser tubes 2, causing vapor 12b and liquid condensed from this vapor to flow co-currently across the tube bundle. FIG. 3 illustrates a vapor inlet 52 having a reduced inlet area, with the width of this area being smaller than the diameter of the tube bundle. Decreasing or increasing the area over which vapor enters into the interior of the vapor flow-directing device 50 allows the velocity of the incoming vapor to be increased or decreased, respectively. After contacting condenser tubes 2, the resulting condensed liquid and non-condensed vapor then pass below the bundle these tubes 2 to a vapor-liquid disengagement volume 54 defined within a lower portion of the vapor flow-directing device 50, as shown in FIGS. 2 and 3.

The vapor-liquid disengagement volume 54 provides a space for the settled, condensed liquid and non-condensed vapor to separate. Both a non-condensed vapor outlet 14, directed externally to the column and a condensed liquid outlet 58, directed internally to the column (e.g., back to an internal upper stage contacting device, such as a tray) are in communication with the vapor-liquid disengagement volume 54. FIGS. 2 and 3 further illustrate the use of a deflector plate 56 below the tubes and within the vapor-liquid disengagement volume 54, to aid the separation of vapor and liquid exiting the tube bundle co-currently. The deflector plate 56 may extend horizontally or may be inclined relative to horizontal, in order to improve drainage of condensed liquid in the disengagement volume 54 and ultimately to condensed liquid outlet 58. Condensed liquid outlet 58 may be operated with a liquid seal provided by draining, condensed liquid to prevent vapors in the upper section of column 20 from entering into the interior of vapor flow-directing device 50 upwardly through condensed liquid outlet 58.

Figure 4:
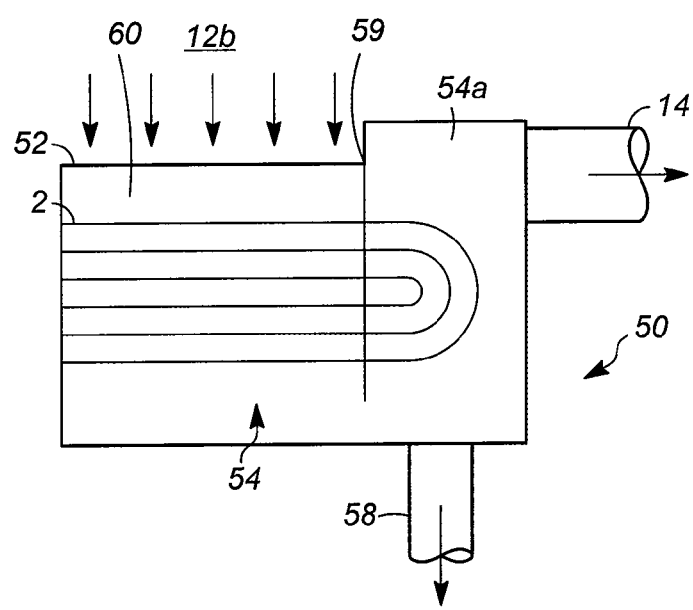
FIG. 4 depicts a representative internal tubular condenser, with the tubes extending horizontally over a co-current contacting section. A divider plate is used to separate the co-current contacting section of the tubes from a horizontally adjacent vapor-liquid disengagement section.

An alternative embodiment is illustrated in FIG. 4, where a divider plate 59 extends vertically into the vapor flow-directing device 50 and divides a co-current contacting section of the tubes, in a contacting volume 60, from a disengagement section of the tubes, in the vapor-liquid disengagement volume 54a. In this case, vapor inlet 52 is located above the co-current contacting section of the tubes 2, while the disengagement section of the tubes receives the non-condensed vapor only after it passes in a downwardly flowing direction across the co-current contacting section of the tubes 2. Divider plate 59, in the configuration of FIG. 4, therefore causes non-condensed vapor exiting contacting volume 60 to reverse flow again, flowing generally upwardly through disengagement volume 54a prior to exiting the non-condensed vapor outlet 14. Divider plate 59 can therefore advantageously reduce the vapor-liquid disengagement volume 54 below the tube bundle and instead allow some of this volume to be positioned horizontally adjacent the contacting volume 60.

Thus, features described above include (i) the vapor flow-directing device, which substantially surrounds (e.g., on three sides) the tube bundle and diverts vapor flow to the top of the bundle and downward therethrough, and (ii) the vapor-liquid disengagement volume defined by the vapor flow-directing device, optionally in conjunction with a divider plate that provides separate (e.g., horizontally spaced apart) sections of the tube bundle for contacting and disengagement of the condensed liquid from the non-condensed vapor. These features can improve the performance of tubular heat exchanges and particularly those which are internal to vapor-liquid contacting apparatuses (e.g., internal distillation column condensers) by mitigating or eliminating flooding concerns, particularly in the tube bundles, enhancing heat transfer by improving vapor and liquid flow over the bundles, and/or providing improved vapor-liquid disengagement. Those having skill in the art will appreciate that changing the sizes and locations of the co-current contacting section and the vapor-liquid disengagement section, as well as the positions of the inlets to and outlets from, the vapor flow-diverting device (e.g., the non-condensed vapor outlet and condensed liquid outlet) can be used to create various flow paths of vapor and liquid across the condenser tubes, to further optimize the performance of the tubular condenser in terms of its heat transfer coefficient and thereby minimize its size. For example, it may be desired to use a vapor-flow diverting device to direct incoming vapor in a horizontal direction, or in an inclined direction, across the tubes of a tube bundle.

In addition to these improvements, tubes having one or more surface enhancements as discussed above may be used to effectively improve their heat transfer coefficient when used in combination with a vapor flow-diverting device and optionally a deflector plate and/or divider plate. These external surface enhancements may optionally be combined with an internal surface coating and/or non-linear or twisted geometries, also as discussed above, to further improve the tube performance. The various tube surface enhancements described herein may serve, alone or in combination, to facilitate this condensate drainage and/or reduce the layer thickness of formed condensate. In representative embodiments, for example, the use of such surface enhancement(s) will generally increase the tube heat transfer coefficient in a given condensing service (e.g., in a distillation column used in the product recovery section in the commercial production of phenol via cumene oxidation) by a factor of at least about 1.5, typically from about 2 to about 10, and often from about 3 to about 5, relative to the heat transfer coefficient obtained with identical tubes but lacking the surface enhancement(s).

As discussed above, this improvement in heat transfer coefficient decreases the tube area needed, such that tubular condensers employing these enhancements can be feasibly installed in larger-diameter distillation columns, for example those having a diameter of generally greater than about 0.9 meters (3 feet), typically in the range from about 1.07 meters (3.5 feet) to about 6.10 meters (20 feet), and often in the range from about 1.22 (4 feet) to about 4.88 meters (16 feet). The use of tube bundles in tubular condensers, in which at least a portion of the individual tubes have surface enhancements as described herein, may in some cases provide an economically attractive alternative, relative to external condensers or even welded plate, internal condensers. Any of the tubes described below, having surface enhancements, will generally have an outer diameter in the range from about 13 mm (0.5 inches) to about 38 mm (1.5 inches), and often from about 19 mm (0.75 inches) to about 32 mm (1.25 inches). The inner diameters of such tubes are generally in the range from about 6 mm (0.25 inches) to about 32 mm (1.25 inches), and often from about 13 mm (0.5 inches) to about 25 mm (1 inch). The inner and outer diameters can be determined and/or optimized for a given service based on a number of factors, including the design flow rates, pressure drops, and heat transfer coefficients, as will be appreciated by those having skill in the art and knowledge of the present disclosure.

Figure 5:
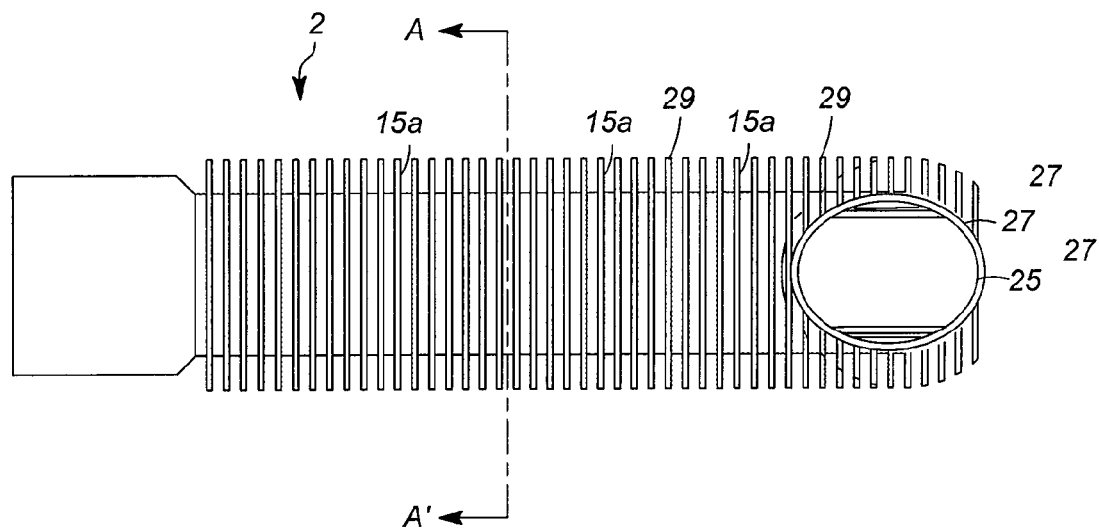
FIG. 5 depicts a representative section of a tube for a tubular condenser, in which the tube has external surface enhancements in the form of circumferentially extending fins as discreet extensions.
Figure 5A:
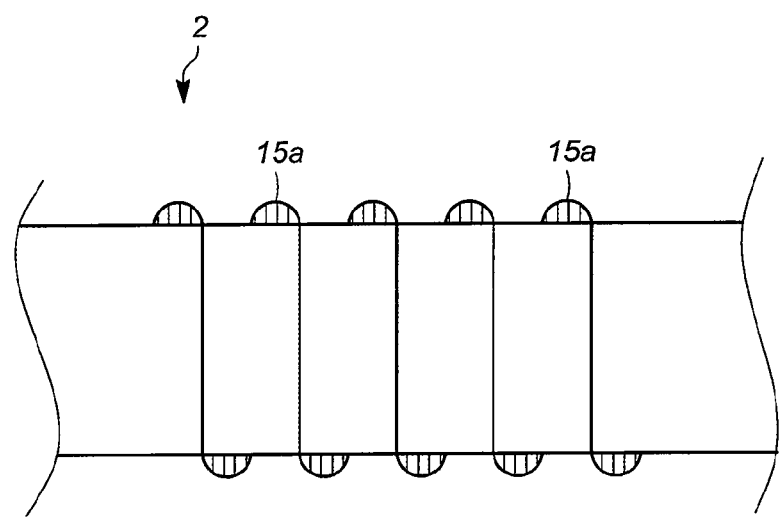
FIG. 5A depicts a representative section of a tube for a tubular condenser, in which the tube has external surface enhancements in the form of circumferentially extending fins as a single, continuously wound, helical spiral.

Any of the tube enhancements, including internal enhancements, as well as different tube geometries (e.g., twisted tubes) described herein are applicable to internal condensers having vertically extending tubes as depicted in FIG. 1, as well as those having horizontally extending tubes as depicted in FIG. 4. In the case of internal distillation column condensers having vertically (or substantially vertically) or horizontally (or substantially horizontally) oriented condenser tubes, surface enhancements, in at least the region of the tubes extending over a section of the column length, include circumferentially extending fins, as illustrated in FIG. 5. FIG. 5A shows circumferentially extending fins 15a provided by a single, continuously wound, helical spiral rather than discreet extensions, as shown in FIG. 5. In the case of tubes 2 comprising circumferentially extending fins 15a, a fin height of less than about 6.4 mm (0.25 inches) is representative, with fin heights typically being in the range from about 0.51 mm (0.02 inches) to about 5.1 mm (0.20 inches), and often being in the range from about 0.76 mm (0.03 inches) to about 3.8 mm (0.15 inches). As is illustrated in the cross-sectional view of FIG. 6, circumferentially extending fins 15a may be in the form of flat plates or discs having a circular cross section that is concentric with circular cross sections of internal surface 25 and external surface 27 with these cross sections being circles with inner and outer diameters, respectively, of tubes 2. The fin height can therefore be measured as the distance from the external surface 27 of a tube 2 to the outer edge 29 of circumferentially extending fin 15a. In cases where the fins have geometries that are not circular (e.g., elliptical or rectangular), where the fin cross sectional shape is not concentric with the central axis of the tube 2, or where the tube 2 itself has a non-circular (e.g., flattened or elliptical) cross section, the fin height may be the average distance from the outer edge 29 of circumferentially extending fin 15a to the external surface 27 of tube 2.

Figure 6:
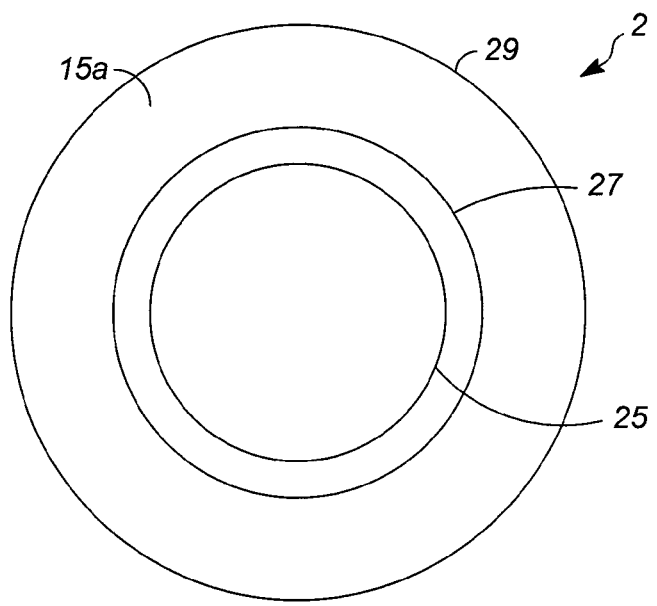
FIG. 6 depicts a cross-sectional view of the tube section of FIG. 5, through A-A'.
Figure 7A:
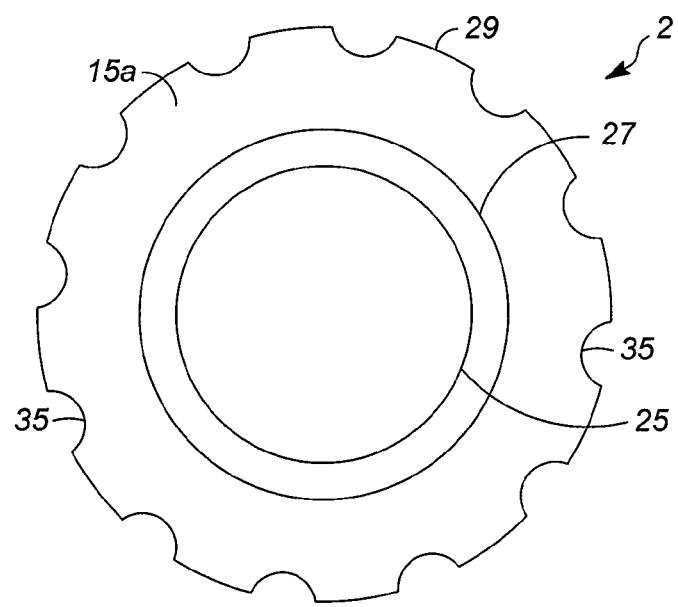
FIG. 7A depicts a modification of the tube of FIGS. 5 and 6, in which a plurality of axially aligned notches, having a curved cross-sectional shape, are included on outer edges of circumferentially extending fins.
Figure 7B:
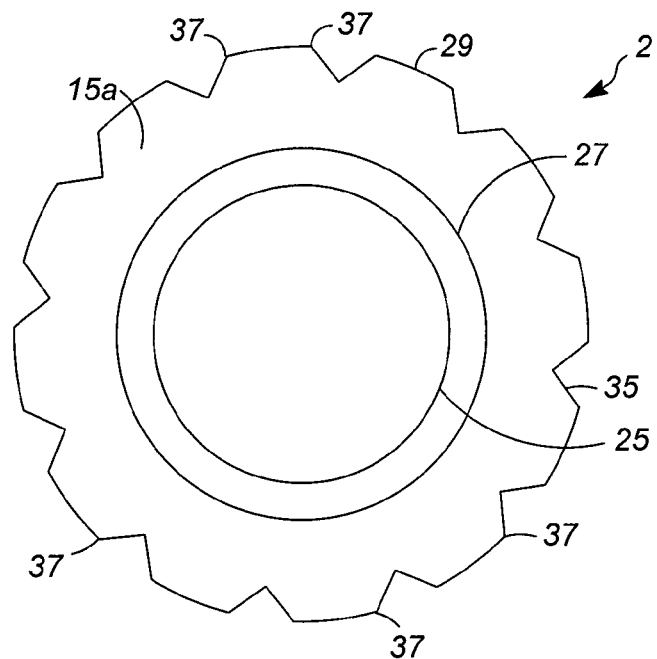
FIG. 7B depicts a further modification of the tube of FIGS. 5 and 6, in which a plurality of axially aligned notches, having a triangular cross-sectional shape, are included on outer edges of circumferentially extending fins.
Figure 7C:
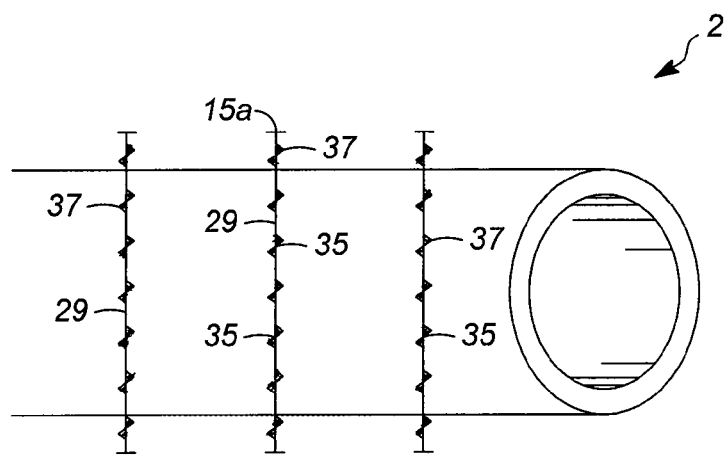
FIG. 7C depicts a representative section of a tube having circumferentially extending fins as shown in FIG. 7B, but with the notches being bent at their respective corners outside of the plane of the circumferentially extending fins, and in opposite directions.

FIG. 7A shows a cross-sectional view of a tube 2 having surface enhancements in the form of fins 15a, as shown in FIGS. 5 and 6. In the embodiment illustrated in FIG. 7A, however, a plurality of notches 35 are "cut" from, or shaped in, the outer edges 29 of fins 15a. Notches 35 shown in FIG. 7A have a curved cross-sectional shape (e.g., semi-circular), but other curved cross-sectional shapes or rectangular cross-sectional shapes may be used for notches 35. For example, FIG. 7B shows notches 35 having a triangular cross-sectional shape. Also as illustrated in FIGS. 7A and 7B, notches may be spaced evenly about the outer edge 29 or periphery of fin 15a. In a particular embodiment, in which circumferentially extending fins 15a, as surface enhancements, have outer edges 29 that include notches 35 having a triangular (or other) cross-sectional shape, these notches 35 may be bent at their respective corners 37 outside of the plane of the circumferentially extending fins, for example opposing corners 37 of a triangular cross section may be bent in the same or opposite directions. In the particular embodiment illustrated in FIG. 7C, for example, these notches 35 are bent at their respective corners 37 in opposite directions. In a preferred embodiment, and particularly in the case in which the tubes are used in vertical, column-installed condensers, all or a portion of notches 35, whether or not they are bent, may be aligned axially, with one or more corresponding notch(es) in the outer edge of one or both adjacent circumferentially extending fins (e.g., in both of the circumferentially extending fins located immediately above and immediately below, in the case of a vertically extending tube). Axial alignment of notches is also illustrated in the representative embodiment of FIG. 7C. This axial alignment of notches can promote improved drainage of condensate from the tubes, particularly in the vertical direction.

Figure 8:
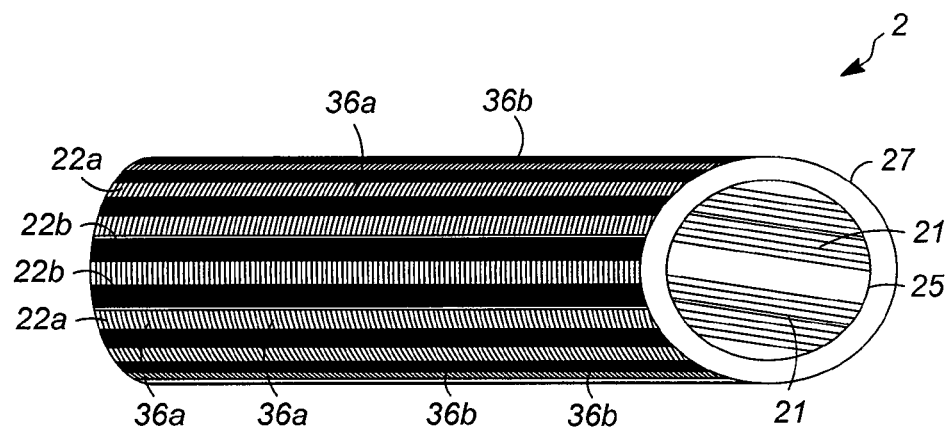
FIG. 8 depicts a representative section of a tube having surface enhancements in the form of small shaped recessions aligned in axially extending rows that alternate, about the radial tube periphery, with larger, axially extending shaped recessions in the form of troughs, as well as internal spiral ridges.
Figure 9:
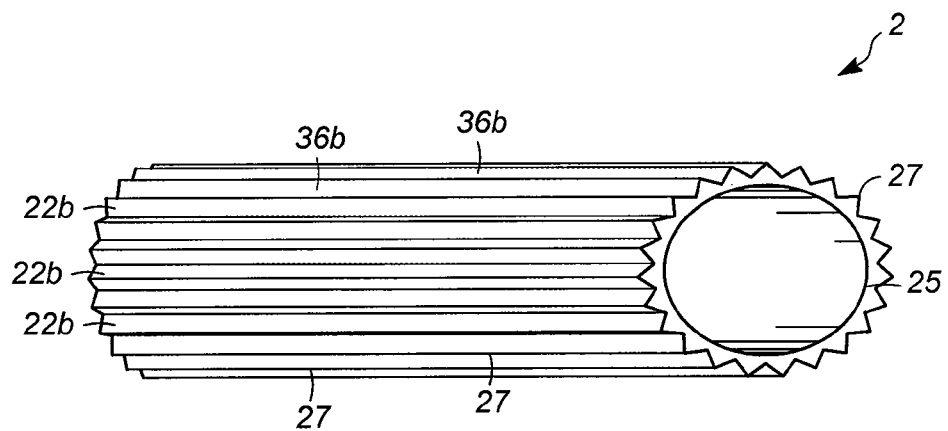
FIG. 9 depicts a representative section of a tube having surface enhancements in the form of axially extending shaped recessions or troughs that form axially extending ridges resulting from the axial extension of sections or points of the external tube surface that do not form the recessions.

In the same manner as described above with respect to notches on outer edges of fins, notches or recessions having various cross-sectional shapes may be formed directly on the outer surfaces of heat exchanger tubes to provide surface enhancements. Extending these notches in the axial direction on the tube surface results in elongated troughs about the tube periphery. Alternatively, discreet, shaped recessions may be formed on the external tube surface. While the recessions themselves may be small, if desired, in order to provide an effective capillary action that reduces condensate layer thickness, such smaller recessions may be aligned axially to provide an axial or generally axial flow path for condensed liquid. FIG. 8 depicts tubes 2 having shaped recessions 36a, 36b on the external surface, where a portion of these recessions 36a are smaller and are aligned in axially extending rows 22a, for example, with outer edges of the recessions in a row 22a forming a line that extends axially along the external surface of the tube. As discussed above, these smaller, discreet shaped recessions 36a on the tube surface can act as capillaries, such that the surface tension of the condensed liquid is drawn into recessions 36a. In a representative embodiment, in order to provide capillary action, each individual shaped recession will normally have only a small area, typically less than about 5 mm² (7.8×10⁻³ in²) and often in the range from about 0.1 mm². (1.6×10⁻⁴ in²) to about 4 mm² (6.2×10⁻³ in²). Aligning at least some of the recessions in one or more axially extending rows may improve drainage of the condensed liquid, particularly in the case of a vertically extending internal tubular condenser. In the embodiment shown in FIG. 8, the axially aligned, smaller, discreet shaped recessions 36a are used as surface enhancements in combination with axially elongated shaped recessions 36b (i.e., with the individual recessions extending over a longer axial portion). Both of these surface enhancements may be used in a common region of the tube that extends over a section of the length of a distillation column where condensation occurs. In the particular embodiment illustrated in FIG. 8, rows 22a of discreet, shaped recessions 36a alternate radially about the tube periphery with rows 22b of larger, axially extending shaped recessions 36b (e.g., in the form of troughs), between which rows the external surface 27 of tube 2 may be smooth. FIG. 8 also depicts internal enhancements on internal surface 25, namely spiral ridges 21, which may be used for improved heat exchange. In FIG. 9, the axially extending, shaped recessions 36b are in the form of troughs having a triangular cross-sectional shape.

Figure 10A:
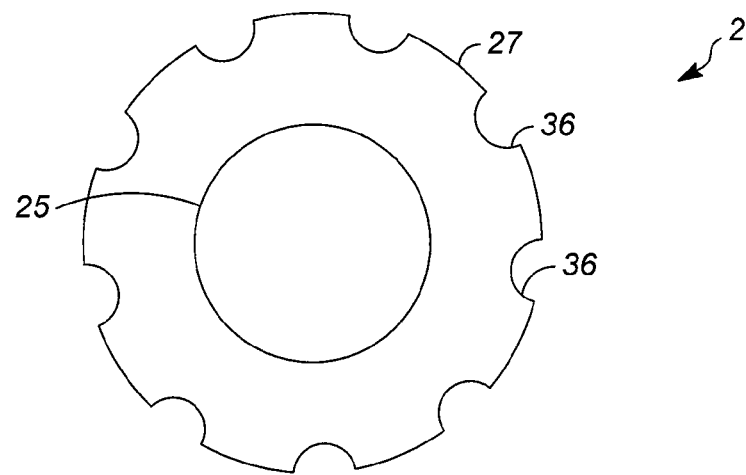
FIG. 10A depicts a cross-sectional view of a tube having surface enhancements in the form of axially extending shaped recessions having a semi-circular cross-sectional shape and spaced about the radial tube periphery.
Figure 10B:
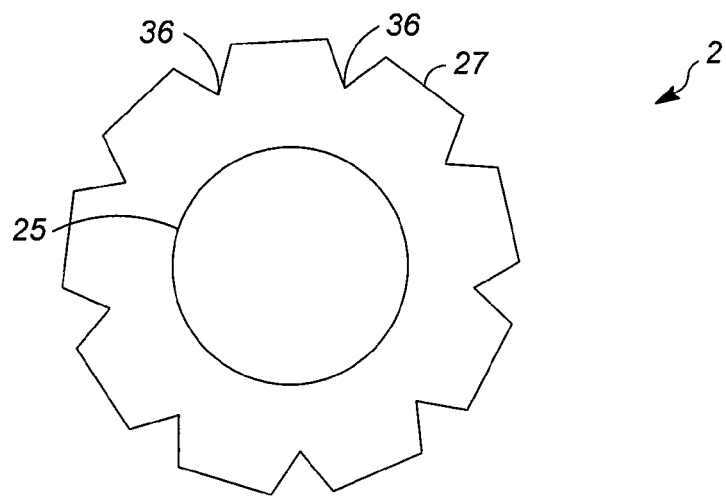
FIG. 10B depicts a cross-sectional view of a tube having surface enhancements in the form of axially extending shaped recessions having a triangular cross-sectional shape and spaced about the radial tube periphery.
Figure 10C:
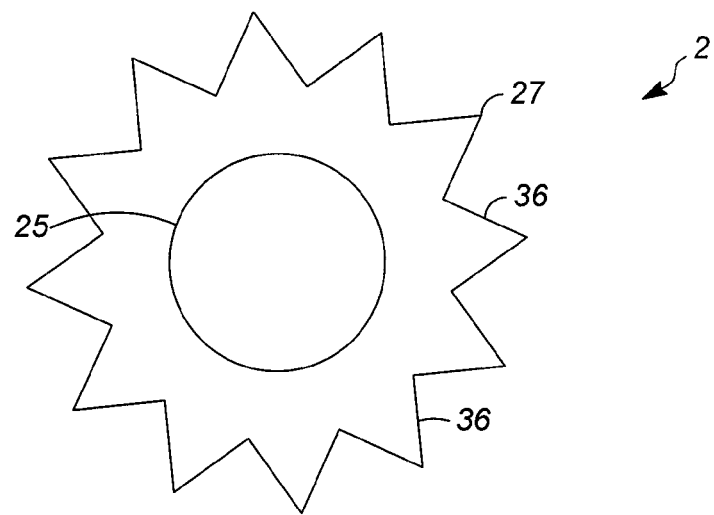
FIG. 10C depicts a cross-sectional view of a tube having surface enhancements including both axially extending shaped recessions, having a notched, triangular cross-sectional shape, that form alternating axially extending ridges.

FIGS. 10A-10C illustrate in more detail some representative cross sections of tubes having shaped recessions 36 on their external surfaces 27. In particular, the shaped recessions 36 in FIG. 10A have a curved cross-sectional shape that is semi-circular, while the shaped recessions 36 in FIG. 10B have a triangular cross-sectional shape. Other curved and rectangular (e.g., semi-elliptical and square) cross-sectional shapes are possible. Another embodiment in which tube surfaces are enhanced with shaped recessions 36 is shown in FIG. 10C, where, as in FIG. 10B, the cross-sectional shapes of recessions 36, spaced (e.g., uniformly) about the periphery of the surface of tube 2, are triangles. In the embodiment shown in FIG. 10C, however, these triangles are broad enough such that only small sections or points of the external surface 27 of tube 2 remain (or are not part of the shaped recessions), with these sections being spaced radially about the periphery of tube 2. The axial extension of these sections or points results in axially extending ridges. Such a tube with axially extending, shaped recessions 36*b* or troughs aligned in axial rows 22*b* is also illustrated in the front view of FIG. 9.

Figure 10D:
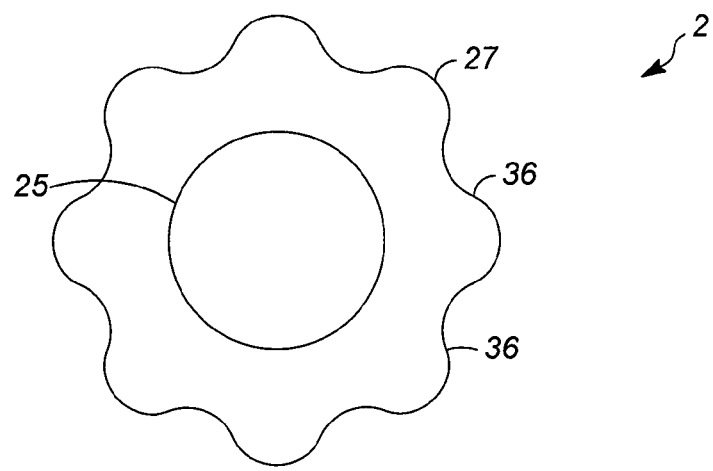
FIG. 10D depicts a cross-sectional view of a tube having surface enhancements in the form of axially extending shaped recessions having a semi-circular cross-sectional shape, with the axially extending ridges formed between these shaped recessions also having a semi-circular cross-sectional shape.

In FIG. 10D, the axially extending ridges, similarly formed between these shaped recessions, have a smooth, curved (e.g., semi-circular) cross-sectional shape of the same or similar dimension as the curved cross sectional shape forming the shaped recessions. The cross sectional shape of this tube therefore has a generally circular perimeter defined by alternating, concave and convex curves (e.g., semi-circles). The resulting, smooth external surface contrasts with the embodiment shown in FIG. 10A, where the shaped recessions form edges. Therefore, as shown, for example in the embodiment of FIG. 10D, the shaped recessions can provide a fluted profile of a fluted tube. Fluted tubes or other tubes having axially extending shaped recessions or discreet, shaped recessions aligned in axially extending rows as depicted, for example, in FIGS. 10A-10D may be characterized as having two outer diameters. Smaller and larger outer diameters may be the distances, respectively, to opposing deepest points of recessions 36 and opposing external surfaces 27, with each of these distances being measured through the center of the cross section of tube 2. Representative tubes having axially extending shaped recessions will have smaller and larger outer diameters in the ranges from about 13 mm (0.5 inches) to about 32 mm (1.25 inches) and from about 19 mm (0.75 inches) to about 38 mm (1.5 inches), respectively. In exemplary embodiments, such a tube will have outer diameters of about 19 mm (0.75 inches) and about 25 mm (1.0 inches) or outer diameters of about 25 mm (1.0 inches) and about 32 mm (1.25 inches).

Figure 11:
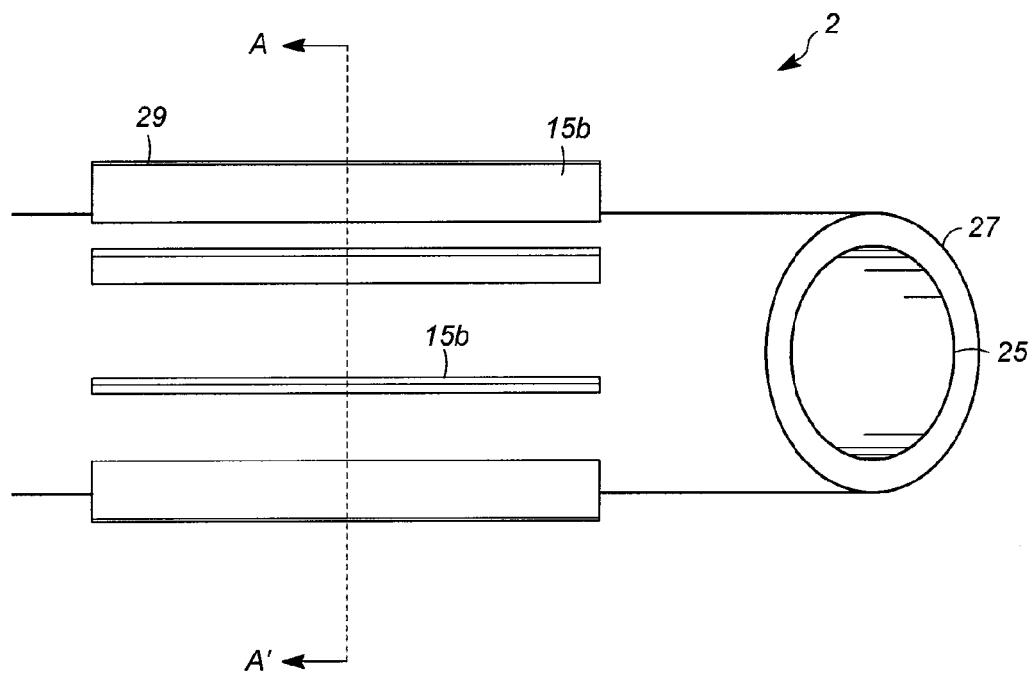
FIG. 11 depicts a representative section of a tube having surface enhancements in the form of axially extending fins that are spaced about the radial tube periphery.

Additional surface enhancements to improve heat transfer for vertically extending tubes are shown in FIG. 11, which depicts tubes having a plurality of axially extending fins 15*b* that may, for example, be in the form of flat plates raised above the external surface 27 of the tube 2 and extending axially along the length of the tube. Representative fins may have a fin height as described above with respect to the heights of circumferentially extending fins, with the fin height also being based on the distance (or average distance) between the outer edge 29 of axially extending fin 15*b* and the external surface 27 of tube 2. Otherwise, the fin heights of axially extending fins may be relatively higher, for example with ranges from about 3.2 mm (0.125 inches) to about 25 mm (1 inch), and often from about 6.4 mm (0.50 inches) to about 19 mm (0.75 inches) being representative.

Figure 12:
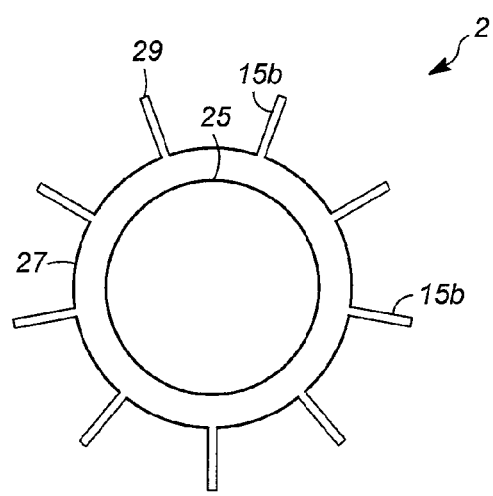
FIG. 12 depicts a cross-sectional view of the tube section of FIG. 11, through A-A'.
Figure 13A:
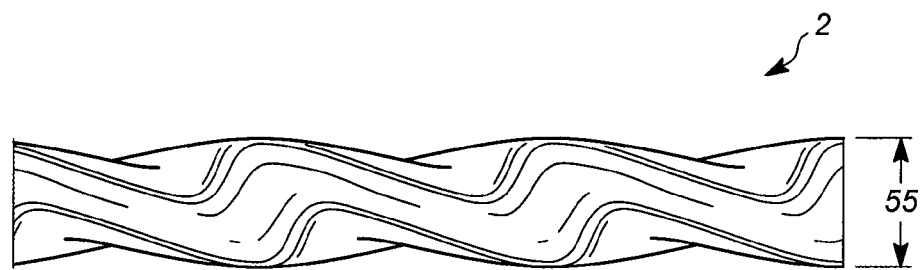
FIG. 13A depicts a representative section of a tube having a twisted tube geometry as a tube enhancement.
Figure 13B:
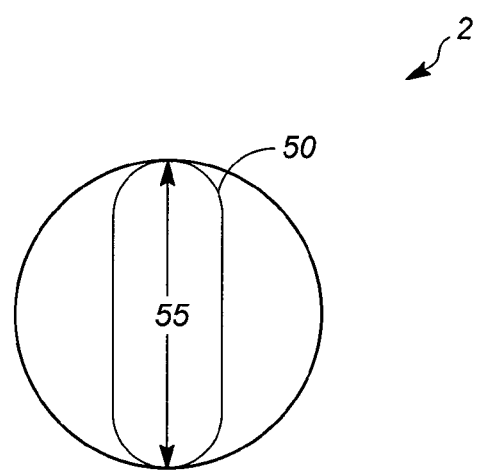
FIG. 13B depicts a cross-sectional view of the tube of FIG. 13A.

A cross-sectional view of the tube shown in FIG. 11, having a plurality of axially extending fins 15*b*, in this case spaced uniformly about the radial periphery of the tube 2, is shown in FIG. 12. As discussed above with respect to circumferentially extending fins (15*a* in FIG. 5), axially extending fins 15*b* may also have notches with various cross-sectional shapes. FIG. 13A illustrates a tube having a twisted tube geometry to provide an overall helical fluid flow path within the tube. As seen in the cross-sectional view of FIG. 13B the eccentric profile tube has an oval-shaped cross section 50, with the major axis 55 that rotates clockwise or counterclockwise along the linear direction of the tube).

Any of the axially extending features (i.e., in the same or substantially the same direction as the central axis of the tube) discussed above, such as axially extending shaped recessions, axially extending rows of shaped recessions, or axially extending fins, are therefore vertically or horizontally extending features, depending on whether the tubes are aligned vertically or horizontally, respectively. In alternative embodiments, any of the described, axially extending features may extend or be aligned generally in the axial direction along the length of the external surface of the tube, in a non-linear path such as a wave, spiral, jagged line, etc. Such embodiments provide a generally axial flow path (e.g., corresponding to the downward flow path of condensed liquid along the tube when positioned vertically) for fluid contacting the heat exchange surface, where this flow path provided by the features is not directly, but only generally, axially.

The use of axially or generally extending shaped recessions and/or fins, in this manner, as tube surface enhancements, can reduce condensate film thickness and/or facilitate condensate drainage, thereby improving the heat transfer coefficient of the tube. Such features as surface enhancements for tubes are particularly advantageous in internal tubular condensers (e.g., disposed in distillation columns), where the heat exchange surface area, as well as the total weight of equipment that can be practically installed (e.g., at or near the top of the column or tower), is limited. The tube surface enhancements discussed above may be used alone or in combination. The tube surface enhancements may also be used in combination with internal enhancements as discussed above, and particularly spiral ridges that may act to further improve heat transfer. Otherwise, these surface enhancements may be combined with a coating, such as a porous metallic matrix used to form an enhanced boiling layer as discussed above, that is bonded onto internal surfaces of the tubes, for example, in at least the same region of the tubes (e.g. extending over a section of the column height) as the surface enhancements. The surface enhancements may also be used in tube bundles in which all or a portion of the tubes have a non-linear central axis (e.g., a helical axis), or otherwise have a twisted tube geometry as discussed above, in at least the same region of the tubes as the surface enhancements. In a representative embodiment, for example, a tube bundle of a condenser, having tubes with a fluted tube profile and an internal enhancement including one or more spiral ridges, is aligned vertically in the upper section of a distillation column. Various other combinations of surface enhancements, optionally with an internal surface coating and/or non-linear or twisted geometries, can be incorporated into tubes to improve their heat transfer coefficient, particularly when the tubes are used in a tube bundle that is oriented vertically and used in a service in which condensate drains vertically from the external surfaces of the tubes (i.e., on the "shell side" of the condenser).

Overall, aspects of the invention are directed to improvements in heat exchangers and particularly tubular exchangers oriented horizontally or vertically within contacting apparatuses such as distillation columns. Those having skill in the art, with the knowledge gained from the present disclosure, will recognize that various changes can be made in the above apparatuses, heat exchangers, tubes, and vapor-liquid contacting (e.g., distillation) methods without departing from the scope of the present disclosure. Mechanisms used to explain theoretical or observed phenomena or results, shall be interpreted as illustrative only and not limiting in any way the scope of the appended claims.

The invention claimed is:

1. An apparatus for vapor-liquid contacting, comprising
a vertically oriented column having disposed therein a plurality of condenser tubes;
an upper section of the vertically oriented column configured for receiving vapor rising upwardly from a lower contacting section of the column;
a vapor flow-directing device disposed within the column and having a vapor inlet above at least a co-current contacting section of the tubes and defining a vapor-liquid disengagement volume, wherein the vapor inlet is in fluid communication with the upper section of the column for redirecting at least a portion of the vapor rising in the upper section downwardly through the co-current contacting section of the tubes;

a non-condensed vapor outlet external to the column and in communication with the vapor-liquid disengagement volume;

a condensed liquid outlet internal to the column and in communication with the vapor-liquid disengagement volume; and a divider plate extending into the vapor flow-directing device and dividing the co-current contacting section of the tubes, in a contacting volume, from a disengagement section of the tubes, in the vapor-liquid disengagement volume, wherein the divider plate extends substantially vertically and wherein:

the condenser tubes extend substantially horizontally and each include a U-bend portion; and the U-bend portions of the condenser tubes are located in the disengagement section.

2. The apparatus of claim 1, wherein the vapor flow-directing device comprises a shroud positioned within the vertically oriented column, and further wherein said shroud includes at least three side surfaces, a bottom surface, a top surface, and wherein the vapor inlet is defined within the top surface of said shroud.

3. An apparatus for vapor-liquid contacting, comprising:
a vertically oriented column having disposed therein a plurality of condenser tubes;

an upper section of the vertically oriented column configured for receiving vapor rising upwardly from a lower contacting section of the column;

a vapor flow-directing device disposed within the column and having a vapor inlet above at least a co-current contacting section of the tubes and defining a vapor-liquid disengagement volume, wherein the vapor inlet is in fluid communication with the upper section of the column for redirecting at least a portion of the vapor rising in the upper section downwardly through the co-current contacting section of the tubes;

a non-condensed vapor outlet external to the column and in communication with the vapor-liquid disengagement volume;

a condensed liquid outlet internal to the column and in communication with the vapor-liquid disengagement volume; and a divider plate extending substantially vertically within the vapor flow-directing device for dividing the co-current contacting section from the disengagement section, wherein the vapor flow-directing device substantially surrounds the co-current contacting section of the tubes on three sides thereof, while allowing the vapor rising to the upper section of the column to pass upwardly between said vapor flow-directing device and the column along said three sides.

4. The apparatus of claim 3, wherein:
the condenser tubes extend substantially horizontally and each include a U-bend portion; and the U-bend portions of the condenser tubes are located in the disengagement section.

5. The apparatus according to claim 3, wherein the divider plate divides the vapor flow-directing device such that the vapor on one side of the divider plate generally flows downwardly and the vapor on the other side of the divider plate generally flows upwardly.

6. The apparatus according to claim 3, wherein at least a portion of the condenser tubes have external surfaces comprising one or more surface enhancements.

* * * * *